J. NEILL.
SAW.
APPLICATION FILED NOV. 15, 1906.
907,168.  Patented Dec. 22, 1908.
FIG. 1.        FIG. 2.
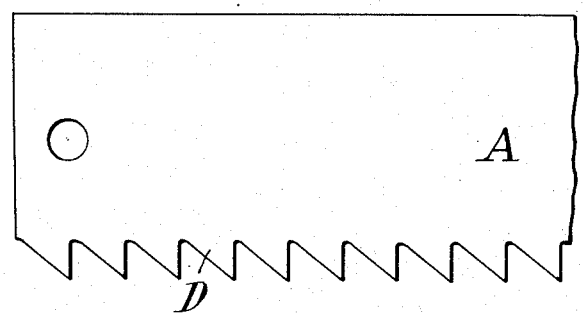
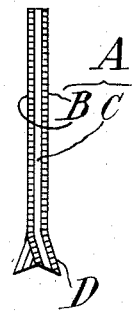
FIG. 3.   FIG. 4.   FIG. 5.
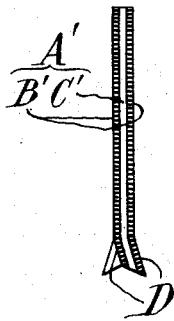
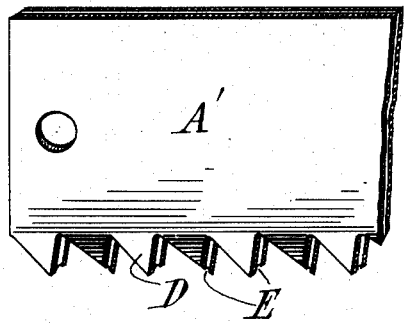
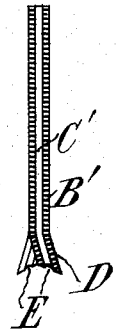
FIG. 6.
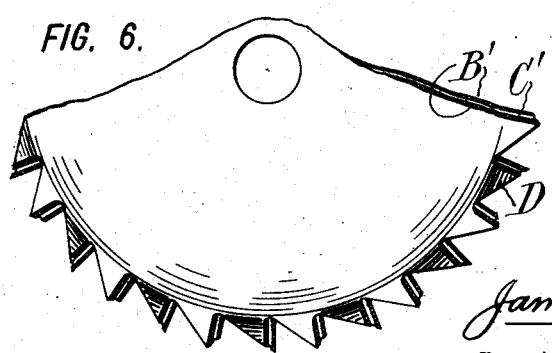
WITNESSES:
Fred White
René Muine
INVENTOR:
James Neill,
By Attorneys,
Arthur & Fraser Maine

UNITED STATES PATENT OFFICE.

JAMES NEILL, OF SHEFFIELD, ENGLAND.

SAW.

No. 907,168. Specification of Letters Patent. Patented Dec. 22, 1908.

Application filed November 15, 1906. Serial No. 343,487.

*To all whom it may concern:*

Be it known that I, JAMES NEILL, a subject of the King of Great Britain, residing at Sheffield, England, have invented certain new and useful Improvements in Saws, of which the following is a specification.

My invention aims to provide certain improvements in saws and is especially applicable to hack saws.

The invention contributes great toughness to the saw, and is of especial advantage for hack saws, that is to say, very light blades such as are generally used in a frame. These blades are broken much more frequently than they are worn out. These blades as ordinarily manufactured weigh only a few ounces to the dozen, and it has heretofore been a very difficult problem to secure toughness in connection with the hardness which is essential. It has been proposed to make the blades of a hard edge and a tougher softer back, but such blades are of unequal elasticity across their width. In practice they are kept straight by tension exerted by the holding frame, and where a softer back is used the saw has a tendency to arch, the back of the blade stretching more than the toothed edge, so that the cutting becomes concave.

According to this invention the blade from the back to the point of the teeth is compounded of two outer bands of high carbon steel and an intermediate band of low carbon steel, the bands being united by a process which makes them substantially integral with each other.

The finished blade has the fine appearance of solid high carbon steel, and the teeth can be made much harder than is now the general practice. Also when the teeth are set the soft portion in the center of each tooth wears away the more rapidly, and has the effect of keeping the teeth very sharp.

An important advantage of this construction is that a very much higher carbon steel can be used than would be possible with a blade or with teeth of solid steel. In solid steel the teeth would break off if the steel were of the desired hardness. With a central layer of soft steel the teeth are rendered exceptionally tough, and a very high carbon steel may be used for the outer portions, so as to make the teeth much harder than is generally the case. In the manufacture of all such saws I provide a very convenient method of securing the desired variations in the material by forming a compound bar which has high carbon steel on its faces, and low carbon steel between and united integrally to the faces, forming the saw teeth on the edge of said bar or blade, and heating and quenching the whole, whereby the high carbon faces are hardened and the low carbon center is substantially unaltered.

The accompanying drawings illustrate an embodiment of the invention.

Figures 1 and 2 are respectively a face elevation and an end elevation of a blade before hardening. Fig. 3 is an end elevation of such blade after hardening. Figs. 4 and 5 are respectively a face elevation and an end elevation after the same saw has been in use for a time. Fig. 6 is a perspective view of part of a circular saw.

Referring to the embodiment of the invention illustrated, the bar or blade A is composed of outer bands B of high carbon steel, and an intermediate band C of low carbon steel, the three bands being integral with each other and extending throughout the width of the blade. The blade may be manufactured by rolling or hammering, or any combination of these two operations, from an ingot cast of steel, preferably of high purity, such as crucible steel, with the different metals in the relative positions shown in the blade. The percentage of carbon in the central part C is preferably so low as to take it out of the class which can be hardened by heating and quenching, although there may be sufficient carbon to permit of a slight hardening or even a spring temper. The different steels are preferably cast directly on each other in the formation of the ingot, or are otherwise united in such a way that during all their subsequent manipulation they remain practically integral with each other. The thickness as well as the composition of the several layers or bands may be varied within a wide range, depending largely upon the nature of the work to which the tool is to be applied. By the method of manufacture described, the thicknesses of the several bands, as well as their compositions, are accurately controllable, so that the structure and qualities of the finished article may be determined with great uniformity and accuracy. The teeth D, or any other desired edge, are formed on the blade in the usual or any suitable way. The final step in the process consists in heating the toothed blade A, and quenching it in oil or water, which results in the hardening of the high carbon steel without substantially decreasing the toughness of the low carbon steel, as previously explained. The product is a blade A', having outer faces B' of extreme hardness, with a center C' contributing great toughness.

Figs. 4 and 5 illustrate the self-sharpening of the blade by the wearing away of the central band of soft metal C', leaving a notch E in the center of the thickness of each tooth D, at each side of which notch there is a sharp edge of the hard face metal B'.

The provision of a hard steel band at each face of the blade is not only a great improvement in appearance over any previous construction, but is of value both in the process of manufacture and in the use of the article. The applying of the high carbon steel at each side of the center makes the bar or blade which is being worked of symmetrical composition, and avoids any tendency to warping such as would occur with any unsymmetrical composition of the high carbon and the low carbon steel. In use the wear comes equally on both faces, and the power to resist the bending strains which occur is dependent more upon the thickness of the blade than upon the nature of the material between the faces; so that the material in the center does not need to resist wear, and in fact serves its function more advantageously by being comparatively soft.

Extensive experiments have shown several important points of advantage peculiar to hack saws made of this composite material. Notwithstanding the particularly rough usage to which the blades are to be subjected, I find that they may be hardened in water and yet be perfectly tough; whereas it is the absolutely universal custom to harden these thin hack saw blades in oil. If hard cast steel, such as is usually employed for making these tools, were hardened in water, it would be made brittle, and when used in a hand frame would break almost at once. Furthermore all these thin long blades when hardened in water warp or twist to a slight extent. The ordinary cast steel blade after hardening in water would break while being stretched in the hand frame; but a blade made according to this invention even when hardened in water and bowed or twisted may be screwed up and stretched in a hand frame without breaking. This is a feature of the greatest importance in practice, as the cost of these blades is largely due to the numerous breakages which have occurred.

While my invention is of greatest value in connection with hack saws, it is also applicable to saws of different types.

What I claim is:—

1. A saw having teeth on an edge thereof, said saw being formed of a compound bar made up of two hard tempered outer bands of high carbon steel containing a sufficient percentage of carbon to permit hardening by heating and quenching, and an intermediate band of tougher low carbon steel so low as to take it out of the class which can be hardened by heating and quenching, said bands extending substantially throughout the width of the saw, and being substantially integral with each other.

2. A hack saw having teeth on an edge thereof and which is of extreme hardness on its faces and of extreme toughness throughout its width, said saw being formed of a compound bar made up of outer bands B of high carbon steel containing a sufficient percentage of carbon to permit hardening by heating and quenching, and an intermediate band C of tougher low carbon steel, so low as to take it out of the class which can be hardened by heating and quenching, said bands extending throughout the width of the saw including the teeth, and being substantially integral with each other, and said outer bands being hard tempered, whereby the blade may be tempered with water without inducing such brittleness as to prevent its being drawn straight in a frame.

In witness whereof, I have hereunto signed my name in the presence of two subscribing witnesses.

JAMES NEILL.

Witnesses:
H. W. D. FIELDING,
THOMAS J. LEE.